(12) United States Patent
Brim et al.

(10) Patent No.: US 6,969,109 B2
(45) Date of Patent: Nov. 29, 2005

(54) REINFORCED SECTIONAL DOOR FOR CARGO BODY

(75) Inventors: Larry W. Brim, Kenton, OH (US); Charles F. Kellogg, Marion, OH (US)

(73) Assignee: Overhead Door Corporation, Farmers Branch, TX (US)

(*) Notice: Subject to any disclaimer, the term of this patent is extended or adjusted under 35 U.S.C. 154(b) by 0 days.

(21) Appl. No.: 10/676,765

(22) Filed: Oct. 1, 2003

(65) Prior Publication Data

US 2005/0072536 A1     Apr. 7, 2005

(51) Int. Cl.[7] ............................................... B60J 5/06
(52) U.S. Cl. .................. 296/186.4; 296/146.11; 160/201; 52/801.12
(58) Field of Search ............. 160/201, 236; 52/801.1, 800.1, 801.11, 801.12

(56) References Cited

U.S. PATENT DOCUMENTS

| | | | |
|---|---|---|---|
| 1,853,141 A | * | 4/1932 | Overholtz ................... 40/624 |
| 3,516,474 A | | 6/1970 | Pemberton et al. |
| 3,844,539 A | * | 10/1974 | Abbott ........................ 256/24 |
| 4,403,452 A | | 9/1983 | Urbanick |
| 4,991,639 A | | 2/1991 | Clay, Jr. et al. |
| 5,749,407 A | | 5/1998 | Brenner et al. |
| 6,041,846 A | | 3/2000 | Langlois |
| 6,062,293 A | * | 5/2000 | Berger, Jr. ............... 160/229.1 |
| 6,161,606 A | * | 12/2000 | Wegner et al. ........... 160/229.1 |
| 6,408,926 B1 | | 6/2002 | Hoofard et al. |
| 6,443,209 B1 | | 9/2002 | Hurst |
| 2003/0127198 A1 | | 7/2003 | Court et al. |

* cited by examiner

*Primary Examiner*—Blair M. Johnson
(74) *Attorney, Agent, or Firm*—Gardere Wynne Sewell LLP

(57) ABSTRACT

Lightweight sectional doors for cargo bodies and the like are reinforced by a reinforcing member supported on an inner wall surface of at least alternate ones of the panels of a multipanel door. The reinforcing member comprises an elongated, preferably extruded member having spaced apart coplanar flanges and an arcuate web interposed the flanges. An integral rib is disposed at the midpoint of the arcuate web to provide additional stiffness for the reinforcing member. The reinforcing member may be secured to selected door panels by conventional mechanical fasteners.

5 Claims, 2 Drawing Sheets

REINFORCED SECTIONAL DOOR FOR CARGO BODY

BACKGROUND OF THE INVENTION

Sectional upward acting doors are ubiquitous in applications for cargo bodies of freight vehicles, including motor trucks, for example. Mobile cargo bodies are, of necessity, fabricated of components which are required to be as light in weight as possible in order to reduce the tare weight of the vehicle. However, such components must also be of sufficient structural integrity as to not fail in normal use. Sectional upward acting doors for cargo bodies are preferably manufactured of lightweight extruded materials including aluminum and plastics. One problem associated with the design and manufacture of sectional doors for cargo bodies pertains to the stiffness of the door panels required to resist damaging deflections due to rough treatment, wind loads and impacts from shifting cargo. A related problem with regard to cargo pertains to that wherein cargo items may shift during transport and lodge against the inside surface of the door and engage with projections, such as hinge components and the like which can prevent opening the door.

Accordingly, there has been a need to provide lightweight sectional doors for cargo bodies and the like which can be conveniently reinforced, when needed, by reinforcing members which in themselves are lightweight while adding the requisite rigidity to the door panels and wherein the reinforcing members do not aggravate but alleviate problems associated with cargo shifting against the door which would prevent the door from being opened. It is to these ends that the present invention has been developed.

SUMMARY OF THE INVENTION

The present invention provides an improved sectional, upward acting door, particularly useful for cargo bodies for freight vehicles, including motor trucks, for example.

In accordance with one aspect of the present invention, a sectional door is provided with elongated reinforcement members, preferably attached to selected ones of the door sections or panels as an add on component when the overall dimensions of the door require the reinforcing member. The reinforcing member is preferably formed of extruded aluminum or plastic and is characterized by an elongated member having a cross section which is at least partially arcuate in shape to provide requisite stiffness when attached to a door panel. The reinforcement member is conveniently provided with opposed flanges and an arcuate web interposed the flanges and wherein the flanges provide for supporting the reinforcement member on a door panel by spaced apart fasteners. Still further, the cross section configuration of the reinforcement member includes a radial rib depending from the arcuate portion for added stiffness and to minimize deflection of the reinforcement member.

Still further, the present invention provides a sectional door reinforcement member which may be mounted on at least alternate ones of sectional door panels making up the door and wherein the reinforcement member is of a configuration which minimizes the likelihood of objects, such as shifted freight or cargo, preventing the door from being opened when lodged against the door.

Those skilled in the art will further appreciate the advantages and superior features of the invention together with other important aspects thereof upon reading the detailed description which follows in conjunction with the drawings.

DETAILED DESCRIPTION OF A PREFERRED EMBODIMENT

Figure 1:
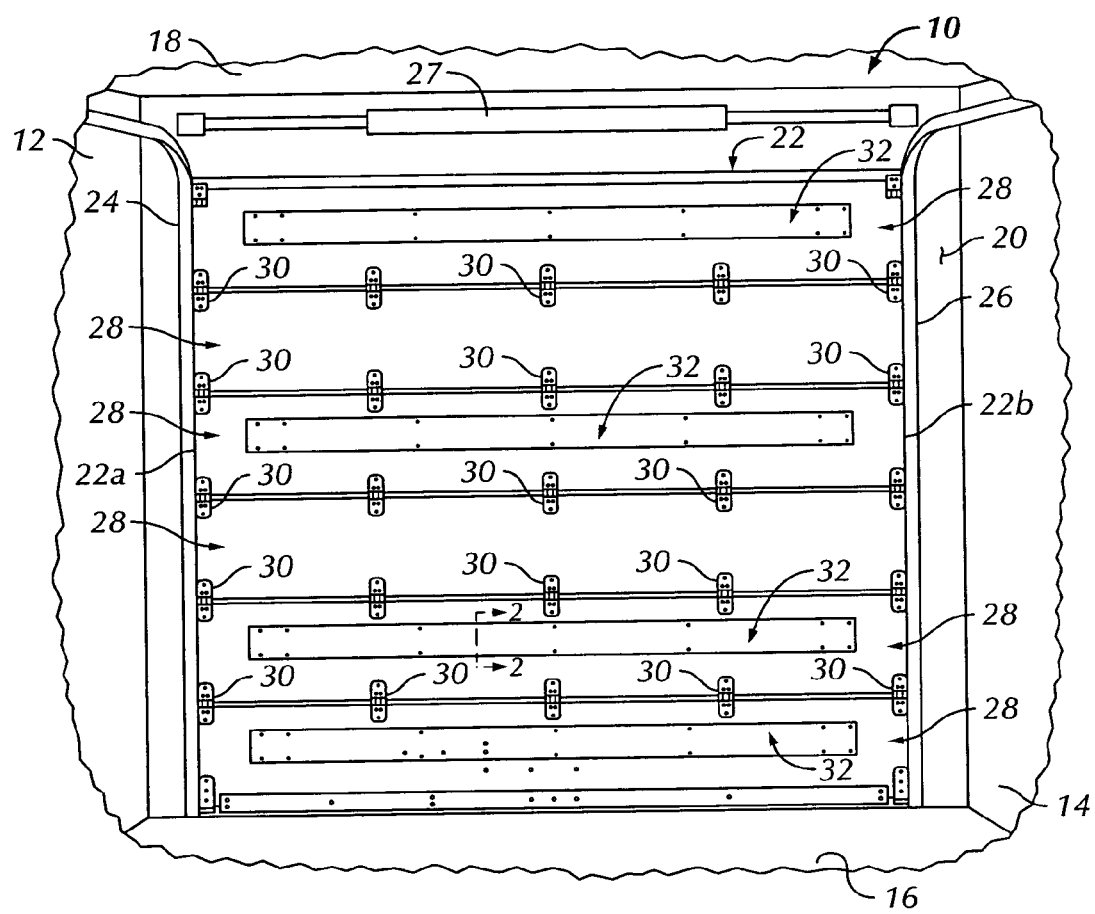
FIG. 1 is a perspective view of a sectional upward acting door for a mobile cargo body including the panel reinforcement members of the present invention.

In the description which follows like parts are marked throughout the specification and drawing with the same reference numerals, respectively. The drawing figures are not necessarily to scale and certain features may be shown in generalized or somewhat schematic form in the interest of clarity and conciseness.

Referring to FIG. 1, there is shown a portion of a cargo body 10 of a mobile freight or cargo vehicle, such as motor truck, viewed from the interior of the cargo body. The cargo body 10 includes opposed side walls 12 and 14, a floor 16 and a ceiling 18. An outer wall 20 interconnects the other walls of the cargo body. An opening in wall 20, not shown, is closed by a sectional upward acting door 22 which may be of somewhat conventional construction except as described herein. The door 22 is mounted on opposed sets of guide rollers, not shown, for guidance and support by opposed track assemblies 24 and 26, also in a generally conventional manner, for movement of the door between a closed position, as shown in FIG. 1, and an open upwardly acted position, not shown. A conventional counterbalance mechanism 27 may be mounted on wall 20 above the door 22 for assisting a person in opening and closing the door.

The door 22 is preferably formed of plural, interconnected, lightweight sections or panels 28 which are interconnected by spaced apart hinge assemblies 30, respectively, which hinge assemblies are of rather conventional construction. The exemplary door 22 is made up of six interconnected panels 28, as shown. Depending on the overall height of the door greater or fewer than six panels may be required to make up a door similar to the door 22.

As a consequence of the construction of the panels 28, and depending somewhat on the overall length of the panels between opposed sides 22a and 22b of the door 22, at least alternate ones of the panels may require reinforcement to avoid unwanted deflection of the door away from the wall 20 as a result of any of the events described hereinabove.

In accordance with the present invention reinforcing members 32 are provided on alternate ones of the panels 28 beginning at the uppermost panel and including the lowermost panel. Again, depending on the number of panels making up a door, such as the door 22, reinforcing members 32 may be disposed on only alternate panels, depending on whether an even or odd number of panels are required for making up the door. Provision of a reinforcing member 32 on the lowermost panel 28 is usually desired.

Figure 2:
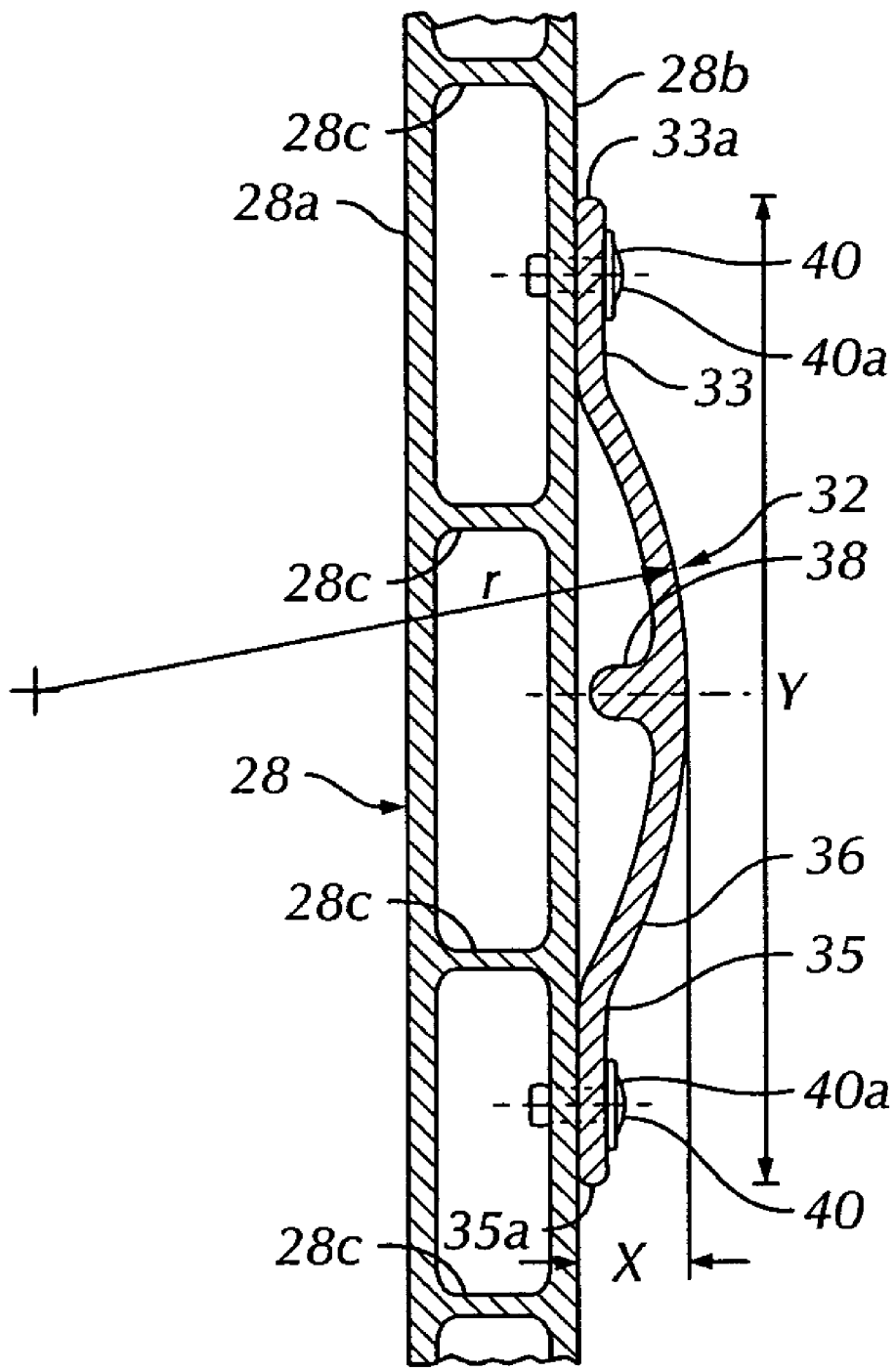
FIG. 2 is a detail section view taken generally along the line 2—2 of FIG. 1.

Referring now to FIG. 2, there is shown a portion of the cross section of one of the panels 28 having a reinforcing member 32 mounted thereon. A typical cross section configuration of a panel 28 is illustrated wherein the panel comprises a front or outer wall 28a spaced from and substantially parallel to an inner or back wall 28b. Walls 28a and 28b are interconnected by integral, substantially continuous webs 28c, as illustrated. Each of the panels 28 is preferably formed of extruded metal or plastic, as shown. Alternatively, the panels 28 may be cast or extruded of other materials.

Referring further to FIG. 2, reinforcing member 32 is characterized by spaced apart, elongated and coplanar flanges 33 and 35 which are interconnected by an arcuate web 36. An elongated depending or radial rib 38 is formed integral with the arcuate web 36 and is substantially equally spaced between the spaced apart flanges 33 and 35. The reinforcing members 32 may also be formed of cast or extruded plastic or metal. The reinforcing members 32 may be secured to the inner wall 28b of a panel 28 by spaced apart mechanical fasteners, such as rivets 40. Rivets 40 have a substantially flush or low profile head part 40a. Conventional screws or an adhesive may also be used to secure the reinforcing members 32 to the respective panels.

The configuration of the reinforcing members 32 is advantageous. The arcuate web 36 adds stiffness to the reinforcing member and, consequently, a panel secured thereto, which stiffness is further enhanced by the elongated rib 38. The coplanar flanges 33 and 35 formed integral with the arcuate web 36 provide a low profile presented to the interior space of the cargo body 10 which minimizes the chance of shifting cargo being caught on one of the reinforcing members and making it difficult or impossible to open the door 22.

In order to minimize the adverse effects of shifting cargo, the overall height x FIG. 2, of the reinforcing members 32 is preferably about the same as the height above the surface of the wall 28b of the respective hinges 30, so that cargo which is shifted directly against the door 22 is unlikely to be caught on one of the hinges during an attempt to open the door. Moreover, by providing a reinforcing member 32 on alternate panels of a multi panel sectional door, sufficient stiffness is obtained for a substantial range of panel dimensions typically used in cargo body doors. The width "y" of each reinforcing member 32, measured between opposed outer edges 33a and 35a of flanges 33 and 35, is preferably about 1.6 to 2.0 times the radius of curvature "r" of the web 36, and more preferably about 1.8 times the radius of curvature.

Conventional engineering materials, as mentioned herein, may be used to fabricate the panels 28 and the reinforcing members 32 and the fabrication of same is believed to be within the purview of one of ordinary skill in the art of sectional doors for cargo bodies. The dimensional relationship between the overall width of the reinforcing members 32, the radius of the arcuate web 36 and the height of the reinforcing member is also preferably such that the web 36 does not project more than a desired distance from the wall 28b while still providing the desired stiffness.

Although a preferred embodiment of a reinforced sectional door has been described in detail herein, including the inventive reinforcing member 32, those skilled in the art will recognize that various substitutions and modifications may be made without departing from the scope and spirit of the appended claims.

What is claimed is:

1. In a sectional door in a mobile cargo body, a plurality of panels interconnected by spaced apart hinges mounted on and projecting from inner surfaces of said panels, respectively, at least selected ones of said panels including an elongated reinforcing member mounted on said inner surfaces thereof, respectively, and comprising one of an extruded and cast elongated member having spaced apart coplanar flanges and a continuous arcuate web interposed and connected to said flanges for reinforcing the stiffness of said selected panels, respectively, said reinforcing members are mounted on said inner surfaces of said panels by spaced apart mechanical fasteners disposed at respective ones of said flanges, the overall width of said reinforcing members between spaced apart outer edges of said flanges is about 1.6 to 2.0 times the radius of curvature of said web, respectively, and the height of said reinforcing members with respect to said inner surfaces is approximately equal to the height of said hinges with respect to said inner surfaces, respectively.

2. The invention set forth in claim 1 wherein:
said reinforcing members each include a rib extending from said web toward said inner surfaces of said panels on which said reinforcing members are mounted, respectively.

3. The invention set forth in claim 1 wherein:
the overall width of said reinforcing members is about 1.8 times the radius of curvature of said web.

4. In a sectional door in a mobile cargo body, a plurality of panels interconnected by spaced apart hinges mounted on and projecting from inner surfaces of said panels, respectively, at least selected ones of said panels including an elongated reinforcing member mounted on said inner surface thereof, respectively, and comprising one of an extruded and cast elongated member having spaced apart coplanar flanges and a continuous arcuate web interposed and formed integral with said flanges, said reinforcing member including a rib extending from said arcuate web toward said inner surface of said panel on which said reinforcing member is mounted, said reinforcing member being mounted on said inner surface of said panel by spaced apart mechanical fasteners disposed at respective ones of said flanges, the overall width of said reinforcing member between opposed spaced part outer edges of said flanges is about 1.6 to 2.0 times the radius of curvature of said arcuate web, and the height of said reinforcing member with respect to said inner surface is approximately equal to the height of said hinges with respect to said inner surface.

5. The invention set forth in claim 4 wherein:
alternate ones of said panels include one of said reinforcing members secured to said inner surface thereof, respectively.

* * * * *